US010309220B2

(12) United States Patent
Van Dyk

(10) Patent No.: US 10,309,220 B2
(45) Date of Patent: Jun. 4, 2019

(54) FASTENER AND METHOD OF SEALING PASSAGE

(71) Applicants: Relborgn Pty Ltd, Claremont (AU); Triomviri Pty Ltd, Claremont (AU)

(72) Inventor: Deon Van Dyk, Canning Vale (AU)

(73) Assignees: Relborgn Pty Ltd., Claremont, Western Australia (AU); Triomviri Pty Ltd, Claremont, Western Australia (AU)

( * ) Notice: Subject to any disclaimer, the term of this patent is extended or adjusted under 35 U.S.C. 154(b) by 260 days.

(21) Appl. No.: 15/124,728

(22) PCT Filed: Mar. 12, 2014

(86) PCT No.: PCT/IB2014/059648
§ 371 (c)(1),
(2) Date: Sep. 9, 2016

(87) PCT Pub. No.: WO2015/136326
PCT Pub. Date: Sep. 17, 2015

(65) Prior Publication Data
US 2017/0016326 A1   Jan. 19, 2017

(51) Int. Cl.
*F16B 1/00*     (2006.01)
*E21D 5/10*     (2006.01)
*F16B 29/00*    (2006.01)
*E21D 11/08*    (2006.01)
*F16B 33/00*    (2006.01)
(Continued)

(52) U.S. Cl.
CPC .............. *E21D 5/10* (2013.01); *E21D 11/083* (2013.01); *F16B 29/00* (2013.01); *F16B 33/004* (2013.01); *F16B 43/001* (2013.01); *F16B 5/02* (2013.01)

(58) Field of Classification Search
USPC ......................................... 411/82.1, 382, 542
See application file for complete search history.

(56) References Cited

U.S. PATENT DOCUMENTS 2,829,502 A * 4/1958 Dempsey ................ E21D 20/02
405/259.6
3,296,919 A * 1/1967 Williams ............... E21D 21/008
411/45
3,521,454 A * 7/1970 Dodds ................. E21D 21/0086
405/259.5
(Continued)

FOREIGN PATENT DOCUMENTS

CN    203081985 U    7/2013
DE    3439986 A1     5/1986
(Continued)

*Primary Examiner* — Gary W Estremsky
(74) *Attorney, Agent, or Firm* — Ballard Spahr LLP

(57) ABSTRACT

A fastener for fastening adjacent portions of a structure requiring fastening is described. The present fastener enables delivery of grout or a sealing composition into a passage between or adjacent the portions of the structure or between adjacent parts of the structure. The portions of the structure may include tubbing rings and segments thereof. The fastener includes an inlet and at least one outlet. The inlet and at least one outlet are connected by a channel. Grout or sealing composition can be delivered into the inlet where it flows through the channel, outwardly through the at least one outlet and into the passage requiring sealing. A method of sealing a passage in a formation using the fastener is also described.

15 Claims, 2 Drawing Sheets

(51) Int. Cl.
*F16B 43/00* (2006.01)
*F16B 5/02* (2006.01)

(56) References Cited

U.S. PATENT DOCUMENTS

| | | | | | |
|---|---|---|---|---|---|
| 3,606,357 | A | * | 9/1971 | Yonkers | F16B 43/001 277/637 |
| 4,177,999 | A | * | 12/1979 | Raber | F16B 43/001 277/637 |
| 4,280,390 | A | * | 7/1981 | Murray | F16B 43/001 411/542 |
| 4,642,964 | A | * | 2/1987 | Kellison | E04B 1/4121 52/699 |
| 4,701,088 | A | | 10/1987 | Crull | |
| 5,401,122 | A | * | 3/1995 | Pate, Jr. | E02D 17/08 405/133 |
| 5,653,078 | A | * | 8/1997 | Kies | E04B 1/4121 49/504 |
| 6,244,807 | B1 | * | 6/2001 | Garcia | F16B 33/004 411/369 |
| 8,382,808 | B2 | * | 2/2013 | Wilberg | A61B 17/864 411/82.1 |
| 8,475,103 | B2 | * | 7/2013 | Michalski | F16B 43/001 411/369 |
| 2003/0099153 | A1 | * | 5/2003 | Renfro | B01F 7/1695 366/169.1 |
| 2015/0114109 | A1 | * | 4/2015 | Wech | G01F 23/02 73/323 |

FOREIGN PATENT DOCUMENTS

DE  102005004485 A1  8/2006
GB  2342369 A  4/2000

* cited by examiner

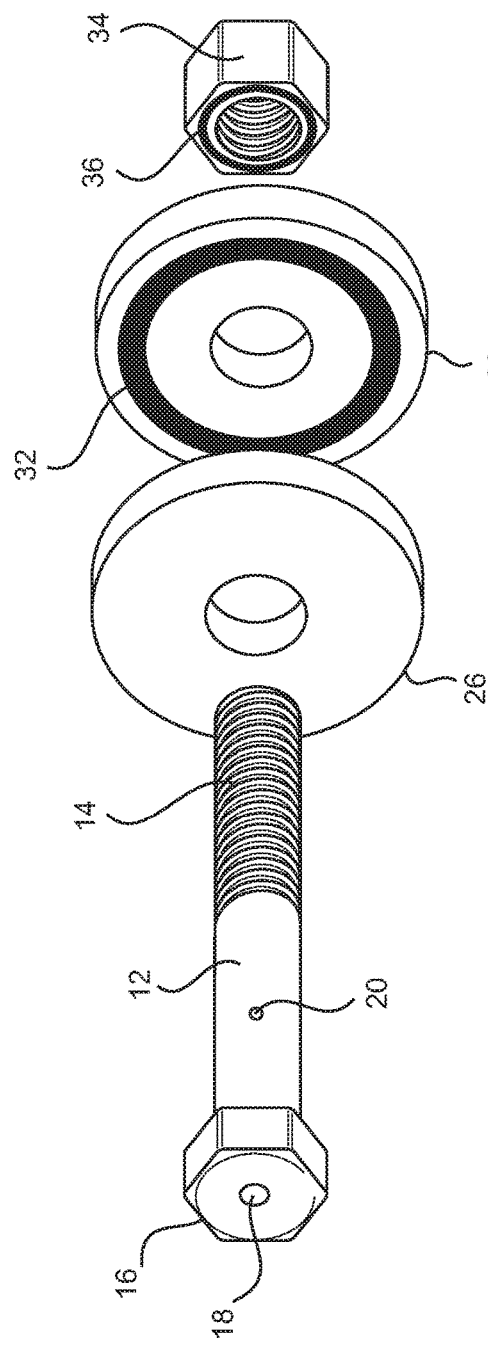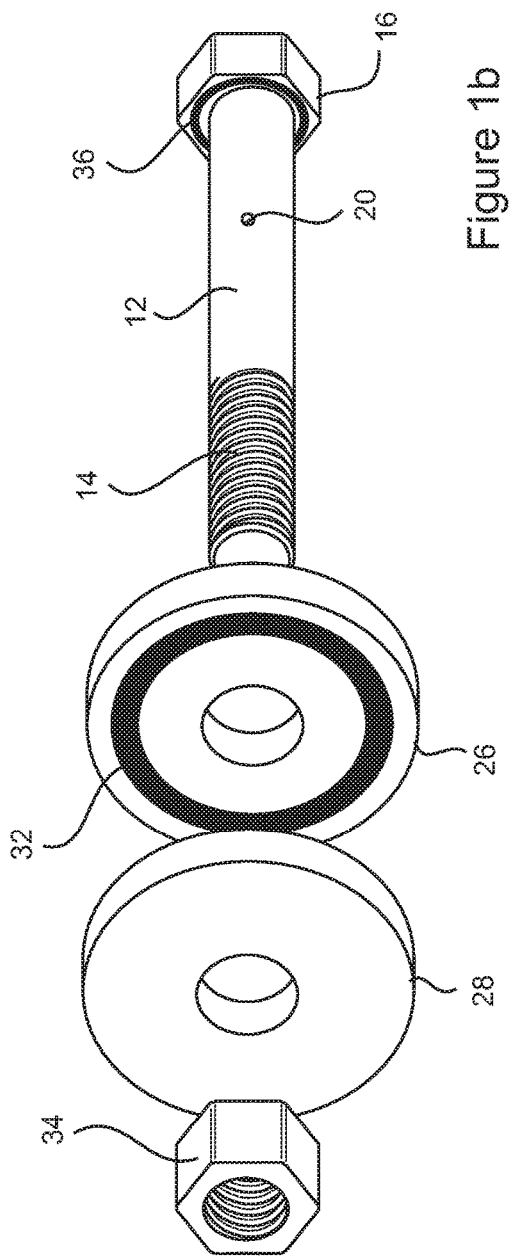

FASTENER AND METHOD OF SEALING PASSAGE

CROSS-REFERENCE TO RELATED APPLICATIONS

This application is a national phase filing of International patent application No. PCT/IB2014/059648, filed on Mar. 12, 2014, which is herein incorporated by reference in its entirety.

FIELD OF THE INVENTION

The present invention relates to a fastener for fastening tubbing segments and tubbing rings. The fastener is adapted to facilitate introduction of grout or sealant for purposes of sealing openings, fissures and the like in surrounding structures, strata and/or between tubbing segments and rings. The present invention also includes a method of sealing incorporating the fastener.

BACKGROUND TO THE INVENTION

Various types of tubbings are known to the art of tunnel or shaft construction. Tubbing typically comprises a lining of metal around the shaft of an excavation, such as a shaft of a mine or tunnel. Tubbing segments are assembled on site into tubbing rings, joined by bolts and typically compressed with concrete. The tubbing rings are assembled and joined together to form a housing to provide support to the excavated tunnel or shaft and also to provide a degree of watertightness. Housings made from tubbings therefore find particularly useful application in excavations of difficult mining and geological conditions, including tunnels or excavations that have been constructed or sunk though water bearing strata. Tubbing is typically used to enable those who sink shafts and underground tunnels to penetrate unstable formations or water bodies with safety. Tubbing can be used to make, support and seal mineshaft walls and underground tunnels such as subway tunnels, ventilation shafts and the like.

Tubbing segments used in these sorts of applications are typically reinforced steel or cast iron. The individual steel or cast iron segments are assembled into rings by bolting and the rings so formed are in turn bolted onto adjacent rings to form the housing. The tubbing has vertical flanges through which holes are drilled to allow tubbing segments to be bolted to one another and horizontal flanges through which holes are drilled to allow adjacent tubbing rings to be bolted to one another. The segments and rings are typically bolted using tubbing bolts which are generally known to the art.

Space outside the tubbing and between the tubbing and the excavated shaft or tunnel can be grouted or concreted to add strength and improve watertightness to the tunnel. Grout or concrete is applied in the space between the tubbing and excavated tunnel to form a barrier to water inflow, reducing water inflow to the tunnel through the tubbing joints. Typically, grout applied behind tubbing is cement-based. However, the grout applied can be one or more other types, including polymer based or latex based grout.

In these applications of grouting, where the aim is essentially to fill the void between the tubbing and the tunnel cavity, a first stage of the operation is to fill the bulk of the cavity with large volume of material. Particularly if cementitious grout is used, the grout can settle during introduction, causing channels to form, through which water can still migrate. These channels can sometimes at least in part be remedied by second stage grouting which can seal these channels and simultaneously lock any tubbing lining into the surrounding ground. If necessary, grout can be applied via injection through an array of holes drilled out from the tubbing and into the surrounding strata.

Despite these measures, water inflow into a tunnel constructed with use of tubbing can still occur. One problem that persists is leakage that can penetrate into the tunnel or into space between tubbing rings via leaks in or at the bolts that hold tubbing segments and/or tubbing rings together, or which attach flanges of tubbing to the tunnel wall. Since these bolts are part of the final structure of the tubbing and hence the constructed tunnel, they remain in place for the duration of the life of the tunnel and so leakage through these points can lead to a persistent problem that diminishes the integrity of the tunnel or shaft.

How large a problem this leaking turns out to be depends on the amount of leakage through each bolt join and the number of bolt joins in any tubbing housing that develop a leak. The seriousness of the problem also depends on what is deemed to be an acceptable level of water inflow into the tunnel. The acceptable level of water inflow in any tunnel situation will depend on a number of factors, including the purpose of the tunnel. For example, a tunnel excavated for purposes of installing a subway will require less inflow of water than a mine shaft. However, even in the context of different mine excavations, the nature of the mineral involved may dictate that the mine be essentially completely dry. Further, some tunnel situations may require longevity of grouting application in preventing water inflow. In these situations, standard cement-based grouting techniques may be less than optimal. There is therefore an existing need for improvements in preventing or reducing leaks in tunnels or shafts constructed using tubbing, particularly in preventing or reducing leaks that occur through joins in tubbing segments or between tubbing rings.

SUMMARY OF THE INVENTION

With the above discussion in mind, it is an object of the present invention to remedy the deficiencies experienced in current tubbing constructions and provide a practical and effective way of limiting or preventing leakage, particularly through bolt joins between tubbing segments or tubbing rings. The present invention also seeks to provide a way of retrospectively modifying existing tubbing structures to limit or prevent leakage through these bolt joins or joins between adjacent tubbing segments or tubbing rings.

Thus, according to a first aspect, the present invention provides a fastener for fastening tubbing segments and/or tubbing rings, wherein the fastener is adapted to deliver a grout or sealing composition into a passage between or adjacent to tubbing segments and/or tubbing rings for purposes of sealing the passage. In a preferred embodiment, the fastener has an inlet and an outlet, the inlet and outlet connected by a channel and whereby grout or sealing composition is delivered into the inlet where it flows through the channel, outwardly through the outlet and into the passage requiring sealing In a particularly preferred embodiment, the fastener includes a shaft with a pair of plate members disposed adjacent opposing ends thereof, each plate member including a sealing member disposed on a surface arranged to lie adjacent a surface of a tubbing segment, wherein the inlet is located on an end of the shaft and the outlet is located intermediate the shaft The shaft is conveniently an elongate solid rod member having a threaded portion on at least one end thereof. Preferably the threaded portion is located at the end opposite to the end having the inlet. The shaft may take the form of a bolt. The shaft has a channel or passage which extends through substantially the centre of the shaft from the inlet in a first end of the shaft towards a mid point in the length of the shaft. The channel continues through the centre of at least a portion of the length of the shaft. This portion can be anywhere between about one quarter to three quarters of the length of the shaft. Preferably, the channel continues through the centre of the shaft to approximately a midpoint thereof, whereupon the channel continues towards the outlet located on an outer surface of the shaft. The outlet is therefore located on an outer surface of the shaft at a point that aligns with an end of the channel distal to the inlet. The outlet is preferably disposed at a point along the length of the shaft that in use substantially aligns with where surfaces of the adjacent tubbing segments or rings meet.

The channel has a width or diameter that is large enough to enable liquid to pass through relatively freely, but yet does not diminish the structural integrity of the shaft. To this effect, it is preferred that the channel has a diameter that is no more than approximately one third the diameter of the shaft.

The plate members disposed at opposing ends of the shaft are comparable to washers in structure and function in that in a preferred embodiment, the plate member is generally circular having a central circular aperture. The central circular aperture has a diameter comparable to the diameter of the shaft, to allow the shaft to pass through. Preferably, the plate member has depth or thickness that lends strength to the plate member. Ideally, the plate member has thickness marginally less than a diameter of the shaft.

Each plate member has a circular channel or groove in the surface intended to lie adjacent a surface of tubbing segment or tubbing ring in use. The channel is disposed intermediate the central circular aperture and an outer edge of the plate member. The channel is arranged to receive and support the sealing member. In a preferred embodiment, the sealing member is a rubber O-ring and this is fitted snugly into the channel. The sealing member serves to ensure or at least minimise likelihood of leakage when the fastener is in use and is in place to join two tubbing segments or rings together.

The fastener further includes a nut which is disposed on the shaft and is securable thereon by means of the threaded portion. The fastener can have a nut disposed on the opposing end of the shaft, adjacent the inlet. In a preferred embodiment, the shaft has a head portion at the end adjacent the inlet. The head portion is substantially fixed in place at the end of the shaft and has an opening which aligns with the inlet of the shaft.

A sealing member is disposed between the head portion and an outer surface of the adjacent plate member. In a preferred embodiment, the sealing member is located in and supported by a circular groove in a surface of the head portion adjacent the plate member. A sealing member is also located between the nut and an outer surface of the plate member adjacent to the nut. In a preferred embodiment, this sealing member is located in and supported by a circular groove in the outer surface of the plate member. It is preferred that the circular groove and hence the sealing member has a diameter marginally larger than the central circular aperture of the plate member. Each of these sealing members may take the form of a rubber O-ring, similar to the O-ring in the inner surface of each plate member, but having smaller diameter.

The fastener is intended for use in joining adjacent tubbing segments and/or adjacent tubbing rings. The fastener of the present invention finds advantageous application in facilitating introduction of grout or other suitable sealant into the tunnel construction, including spaces between tubbing segments and/or tubbing rings and surrounding strata. Advantageously, the present invention also facilitates replacement of existing fasteners or bolts that may have developed leaks and subsequent introduction of grout or sealant to seal leaks that may have formed in the construction of the tunnel and/or surrounding strata.

To this effect, the present invention also provides a method of sealing passages in a formation such as ground formation or in constructed components such as passages between adjacent sections of tubbing or between adjacent tubbing rings. Thus, according to a further aspect of the invention, there is provided a method of sealing a passage in a formation, wherein the formation includes at least two components that are connected with at least one fastener, the fastener having an inlet and an outlet, the inlet and outlet connected by a channel and whereby grout or sealing composition is delivered into the inlet where it flows through the channel, outwardly through the outlet and into the passage requiring sealing, whereby the grout or sealing composition is set or coagulated to form a seal.

In a preferred embodiment, the fastener includes a shaft adapted to be received by corresponding apertures in the components; and a pair of plate members, each plate member having a sealing member disposed on a surface arranged in use to sealingly abut an outer surface of a component; and wherein the shaft has an inlet in an end thereof and at least one outlet located intermediate the length of the shaft, the inlet and outlet being connected by a channel, whereby grout or sealing composition is introduced into the inlet and flows through the channel and outwardly from the outlet into the passage, whereupon the grout or sealing composition is set or coagulated to seal the passage.

It is preferred that the fastener has at least one locking means, such as a nut, that engages with a threaded portion on an end of the shaft. The opposing end of the shaft preferably has a head portion, the combined shaft and head portion essentially forming a bolt. The head portion has a sealing member arranged to sealingly abut an adjacent surface of the adjacent plate member. The nut similarly has a sealing member arranged to sealingly abut an adjacent surface of the plate member adjacent the nut. Once the shaft of the fastener is in place, the nut is tightened to a tight condition to hold the fastener in place and ensure a sealing engagement of each sealing member adjacent respective surfaces of the components. The grout or sealing composition may then be introduced, ideally by pumping under pressure, into the inlet at the end of the shaft, whereby the grout is directed into the passage requiring sealing and the respective sealing members prevent outflow of grout or sealant via any gap that may be present between the various elements of the fastener.

In this method, the grout or sealant is preferably a latex based composition, such as that described in applicant's earlier Australian patent AU 739427 or PCT application PCT/AU2013/000541, the contents of which are hereby incorporated herein by reference.

BRIEF DESCRIPTION OF THE DRAWINGS

The present invention will be more fully understood from the following description made with reference to the following Figures in which:

FIG. 1a is an exploded perspective view of a fastener in accordance with the present invention FIG. 1b is an exploded perspective view of the fastener of FIG. 1a, viewed from an opposite end;

DESCRIPTION OF PREFERRED EMBODIMENT

Figure 2:
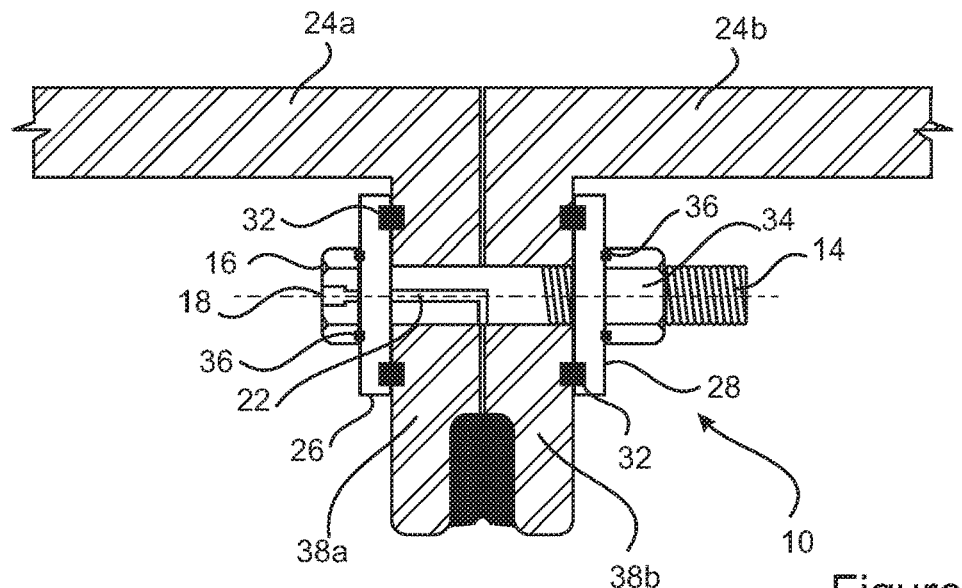
FIG. 2 is a side view of the fastener of FIG. 1 in place to fasten together two components, in this example, two tubbing segments.

It will now be convenient to describe the present invention with reference to the accompanying drawings. It should be understood that the following description is illustrative of explanatory embodiments of the present invention and should not be taken as limiting the scope of the invention to any one embodiment. Further, the Figures depicted in this specification have been included for illustrative purposes only and are not intended to be limiting. It will be understood by the relevant skilled addressee that the embodiments described are typical and illustrative only and can be varied without departing from the scope of the invention.

Referring initially to FIGS. 1a and 1b, there is shown a fastener 10 for typical use in fastening together two components. In the embodiment described, the fastener 10 is described in the context of the application of fastening adjacent tubbing segments, 24a and 24b or tubbing rings used in construction of excavated tunnels and shafts. However, it should be understood that the fastener 10 of the present invention may find similar application in fastening together of components where there is a need to seal passages between the components or in a civil or military structure or geological formation or strata surrounding the components.

The fastener 10 includes an elongate shaft 12 with a threaded portion 14 at one end and a head portion 16 at an opposing end. In this respect, the shaft 12 largely resembles a traditional or standard bolt. The shaft 12 has an inlet 18 in an end thereof, preferably at the end having the head portion 16. The inlet 18 is thus located in the head portion 16, preferably at a centre of the head portion 16.

The shaft 12 also has an outlet 20. The outlet 20 is located intermediate the inlet 18 and an end of the shaft 12 opposite the head portion 16. The outlet 20 is located anywhere along the length of the shaft 12 between one quarter to three quarters of the total length from the head portion 16. In the embodiment shown in the Figures, the outlet 20 is located substantially at a mid-point of the shaft. Referring particularly to FIG. 2, it can be seen that the outlet 20 is located at a point along the length of the shaft 12 that aligns with where surfaces of adjacent tubbing segments 24a, 24b (or rings) meet. This alignment assists in permitting introduction and appropriate penetration of grout or sealing composition into any space between the adjacent segments, as will be discussed further below. However, the fastener 10 may include two or more outlets 20, and these may be located along the length of the shaft 12 in any suitable configuration, such as depending on the requirements of the particular application and the type and number of passages required to be sealed.

The inlet 18 and outlet 20 are connected by a channel 22. The channel 22 extends from the inlet 18 through the centre of the shaft 12 and continues along the longitudinal axis of the shaft 12 towards a point in the centre of the shaft 12 that is adjacent the outlet 20. The channel 22 then continues towards the outlet 20, located on an outer surface of the shaft 12. The channel 22 is thus continuous between the inlet and outlet 18, 20.

The channel 22 has a width or diameter that is large enough to enable liquid to flow through relatively freely, but is small enough so as not to diminish structural integrity of the shaft 12 and hence the fastener 10. Thus, for a fastener 10 having application in fastening together adjacent tubbing segments and having a length of up to about 20 cm and a diameter of about 2 cm, the diameter of the channel 22 would typically be no more than one quarter of the diameter of the shaft 12.

Figure 3:
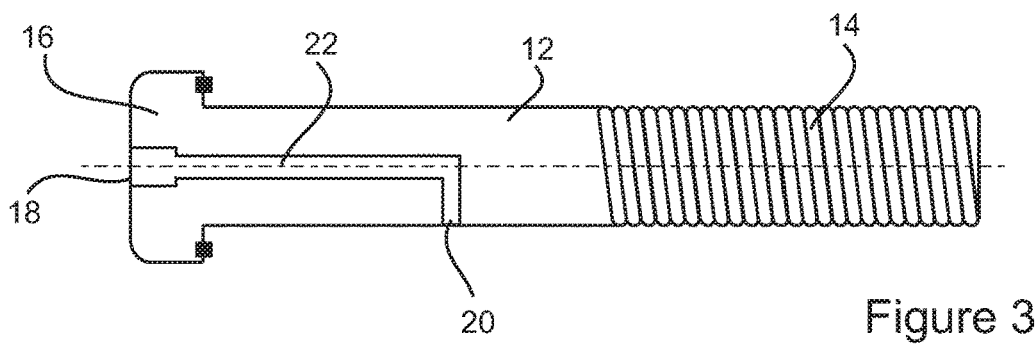
FIG. 3 is a partial cross section of part of the fastener showing placement of a channel through a shaft of the fastener.

In the embodiment shown in the Figures and particularly FIG. 3, the channel 22 has wider diameter at the opening of the inlet 18. This wider diameter is compensated for structurally by the head portion 16 being of wider diameter relative to the shaft 12, so no structural integrity of the fastener 10 is lost. The wider diameter is provided to enable coupling with a grout or sealant port (not shown) as will be described further below.

The fastener 10 further includes a first plate member 26 and a second plate member 28. Each plate member 26, 28 is comparable to a large washer in structure and function in that in the present embodiment, each plate member 26, 28 essentially consists of a generally circular structure having a central circular aperture 30. The central circular aperture 30 has a diameter that is comparable to that of the shaft 12 to allow the shaft 12 to pass through yet allow the plate members 26, 28 to sit perpendicularly to the shaft 12 when the shaft 12 sits in the central circular aperture 30.

Each plate member 26, 28 has a depth or thickness that corresponds with the strength required for the particular application. In the application of fastening adjacent tubbing segments 24a, 24b each plate member 26, 28 will have a thickness marginally less than diameter of the shaft 12. However, the exact dimensions will depend on the material used to construct the plate members 26, 28, the shaft 12 and the fastener 10 as a whole.

Figure 4:
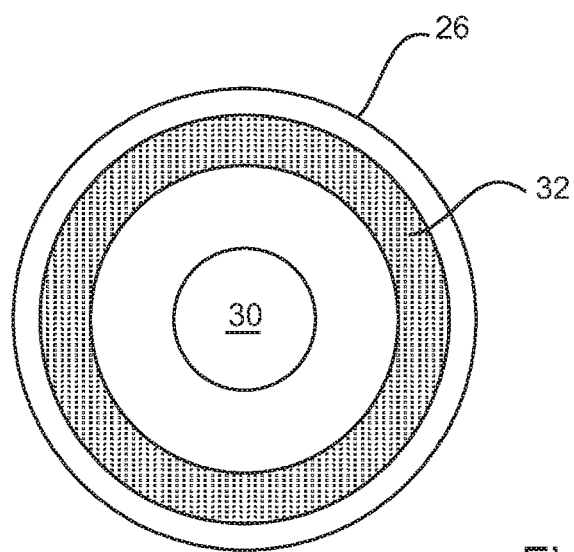
FIG. 4 is a top view of a plate member of the fastener, showing placement of sealing member in a surface of the plate member according to one embodiment of the invention.

Referring particularly to FIG. 4, each plate member 26, 28 has a circular groove in at least one surface thereof. In the present embodiment, this circular groove is located in the surface intended to abut a surface of the tubbing segment. The groove is disposed intermediate the central circular aperture 30 and an outer edge of each plate member 26, 28. The groove is arranged to receive, support and hold therein a sealing member 32.

The sealing member 32 in this embodiment is a rubber O-ring that is fitted snugly into the groove. The sealing member 32 acts to provide sealing engagement of each plate member 26, 28 when they abut respective surfaces of the tubbing segment in use and therefore prevent or limit likelihood of leaking of sealant or grout or any other fluid through any gaps that may be present between the plate members 26, 28 and the surface of the tubbing segments when the fastener 10 is properly in place to join these two segments together.

The fastener 10 further includes a nut 34 which is disposed on the shaft 12 and is secured thereon by engagement with the threaded portion 14. The nut 34 is arranged to abut an outwardly facing surface of the adjacent plate member 28. In the embodiment shown in the Figures and particularly FIG. 2, the plate member 28 has a second groove located in its outwardly facing surface. The second groove, which has a diameter slightly larger than the central circular aperture 30 is located in a concentric arrangement around the aperture 30. The second groove is arranged to receive, support and hold therein a second sealing member 36. In this embodiment, the second sealing member 36 is a rubber O-ring, comparable to the O-ring in the opposing surface of the plate member 28 but having smaller diameter. The second sealing member 36 has similar function to the larger sealing member 32 in that it serves to prevent or minimise flow of fluid between any gap that may be present between the plate member 28 and the nut 34.

Similarly, the head portion 16 also has a groove which receives, holds and supports a second sealing member 36. This second sealing member serves to prevent or minimise flow of fluid between any gap that may be present between the plate member 26 and the head portion 16 when they abut each other in use.

The shaft 12, head portion 16, plate members 26, 28 and nut 34 are all manufactured from steel. The specific grade of steel for each component can be dictated at least in part by the intended application of the fastener 10. A corrosion resistant steel grade may be preferred.

In use, the shaft 12 of the fastener 10 is inserted into corresponding apertures in adjacent tubbing segments. Typically, these apertures are drilled or otherwise created in corresponding mating flanges 38a, 38b of the tubbing segment or of tubbing rings. The shaft 12 with plate member 26 in place adjacent the head portion 16 is inserted into these apertures such that the plate member 26 and sealing member 32 thereon abut the surface of flange 38a. Similarly, head portion 16 and its second sealing member 36 abuts the adjacent and outwardly facing surface of the plate member 26.

The opposing plate member 28 is then placed onto the shaft 12 such that the sealing member 32 abuts the surface of flange 38b. The nut 34 is subsequently placed onto the shaft 12 and threadingly engaged thereon. The nut 34 is threaded and tightened onto the shaft 12 to a snug condition. In this condition, the second sealing member 36 on the plate member 28 sealingly abuts the nut 34.

The fastener 10 of the present invention finds particular utility in facilitating sealing of passages in or surrounding the tubbing segments and tubbing rings. Passages may be present between adjacent sections of tubbing or between adjacent tubbing rings and the presence of these can lead to undesirable leakage via the fastener 10 despite the presence of the sealing members. Passages may also be present in the surrounding formation, such as ground formation or strata, these passages developing over time or from the process of constructing the tunnel or shaft.

In this method, the fastener 10 as placed and substantially secured as described above, facilitates introduction of grout or sealing composition into these passages so as to prevent or limit liquid inflow into the tunnel or shaft. A grout outlet (not shown) is inserted into the inlet 18 and the relatively wider diameter at this opening facilitates engagement with an appropriate nozzle.

Grout or sealing composition, the particular type selected on basis of properties of the particular application at hand, is then introduced into the inlet 18. Ideally, the grout is pumped at pressure into the inlet 18. The grout flows through the channel 22 and outwardly of the shaft 12 via the outlet 20. As described above, the outlet 20 is positioned adjacent the meeting between the mating flanges 38, 38b. The introduced grout can then flow from the outlet 20 and into any passages between the flanges 38, 38b and subsequently into any passages in the surrounding formation.

The grout is permitted to set or coagulate to form a seal in these passages. The method and timing of setting can be modified to suit the particular application at hand and means of modifying setting times has been described in earlier art of the applicant. Once the grout has set, fluid testing can be conducted to ensure integrity of the seal.

The above has been described in the context of using the fastener 10 in the construction of a tubbing formation. However, it should be understood that the present invention finds advantageous application in replacing faulty or leaking fasteners or bolts in existing constructions. In these instances, a leaking or faulty fastener is removed and treated singularly. After removal of the leaking of faulty fastener, the aperture in the tubbing segment or ring is cleaned. This may be by one or more of manual scrubbing with a wire brush or blowing with compressed air. The area can be dried by blowing with warmed air if necessary.

The fastener 10 and its components are then inserted into the apertures substantially as described above. Grout or sealant is introduced or pumped into the inlet 18 of the fastener 10 substantially as described above and permitted to set as per manufacturer specifications. Once set, the single replaced fastener 10 is tested for integrity of sealing. Only if integrity is sufficient is the subsequent faulty or leaking fastener removed and replaced. This process is repeated until all faulty and leaking fasteners have been successfully replaced and leaks minimised or rectified.

The invention claimed is:

1. A fastener for fastening adjacent portions of a structure requiring fastening and delivering grout or sealing composition into a passage between or adjacent the portions and/or tubbing rings to seal said passage, the fastener comprising:
    an inlet and at least one outlet, the inlet and at least one outlet being connected by a channel whereby grout or sealing composition can be delivered into the inlet where it flows through the channel, outwardly through the at least one outlet and into the passage requiring sealing;
    a shaft with a pair of plate members disposed adjacent opposing ends thereof, the inlet of the fastener being located on an end of the shaft and the at least one outlet of the fastener being located intermediate the shaft;
    a head portion; and
    a plurality of sealing members with each plate member including a first sealing member disposed on a surface adapted to lie adjacent a surface of a segment requiring fastening and a further sealing member disposed between the head portion of the fastener and an outer surface of the adjacent plate member.

2. The fastener according to claim 1 wherein the shaft is an elongate solid rod member having a threaded portion on at least one end thereof.

3. The fastener according to claim 2 wherein the channel or passage extends through the shaft up to three quarters of the length of the shaft.

4. The fastener according to claim 2 wherein each outlet is disposed at a point along the length of the shaft that is adapted to substantially align with a meeting of two segments requiring fastening.

5. The fastener according to claim 4 wherein each of the sealing members is a rubber O-ring, respectively received and supported in a circular groove in a surface of each plate member adapted to lie adjacent a surface of the segment requiring fastening.

6. The fastener according to claim 1 wherein the sealing member prevents or minimizes leakage of grout or sealing composition when the fastener is in use and grout or sealing composition is introduced through the inlet.

7. The fastener according to claim 6 wherein the fastener further includes a nut, disposed in use on the shaft and securable thereon by means of a threaded portion.

8. The fastener according to claim 7 wherein said head portion has an opening that aligns with the inlet.

9. The fastener according to claim 8 wherein a sealing member is located between the nut and a surface of the plate member adjacent the nut to provide a seal when the nut is tightened to hold the fastener in place during use.

10. The fastener according to claim 1 wherein said at least one outlet comprises at least two outlets located along said shaft.

11. The fastener according to claim 1 wherein said channel has a wider diameter at an opening of the inlet than along the remainder of its length.

12. A method of sealing a passage in a formation, wherein the formation includes at least two components that are connected with at least one fastener, the at least one fastener comprising:

an inlet and at least one outlet, the inlet and at least one outlet being connected by a channel whereby grout or sealing composition is delivered into the inlet where it flows through the channel, outwardly through the at least one outlet and into the passage requiring sealing;

a shaft with a pair of plate members disposed adjacent opposing ends thereof, the shaft adapted to be received by corresponding apertures in the components, the inlet of the fastener being located on an end of the shaft and the at least one outlet of the fastener being located intermediate the shaft, the inlet and at least one outlet being connected by a channel whereby grout or sealing composition is introduced into the inlet and flows through the channel and outwardly from the at least one outlet into the passage;

a head portion; and a plurality of sealing members with each plate member including a first sealing member disposed on a surface adapted to lie adjacent a surface of a segment requiring fastening and arranged in use to sealingly abut an outer surface of one of the at least two components that are connected with at least one fastener, and a further sealing member disposed between the head portion of the fastener and an outer surface of the adjacent plate member, so as to prevent or minimise leaking of grout or sealing composition when the grout or sealing composition is introduced through the inlet and outwardly into the passage, whereby the grout or sealing composition is set or coagulated to form a seal.

13. The method according to claim 12 wherein the grout or sealing composition is introduced into the inlet under pressure.

14. The method according to claim 13 wherein the components are tubbing segments, tubbing rings or a combination thereof.

15. The method according to claim 12 wherein the fastener and method is applied in replacement of an existing fastener or bolt that has developed a leak.

* * * * *